Jan. 25, 1938.   W. H. PARKER ET AL   2,106,651
PISTON METER
Filed April 9, 1934   3 Sheets-Sheet 2

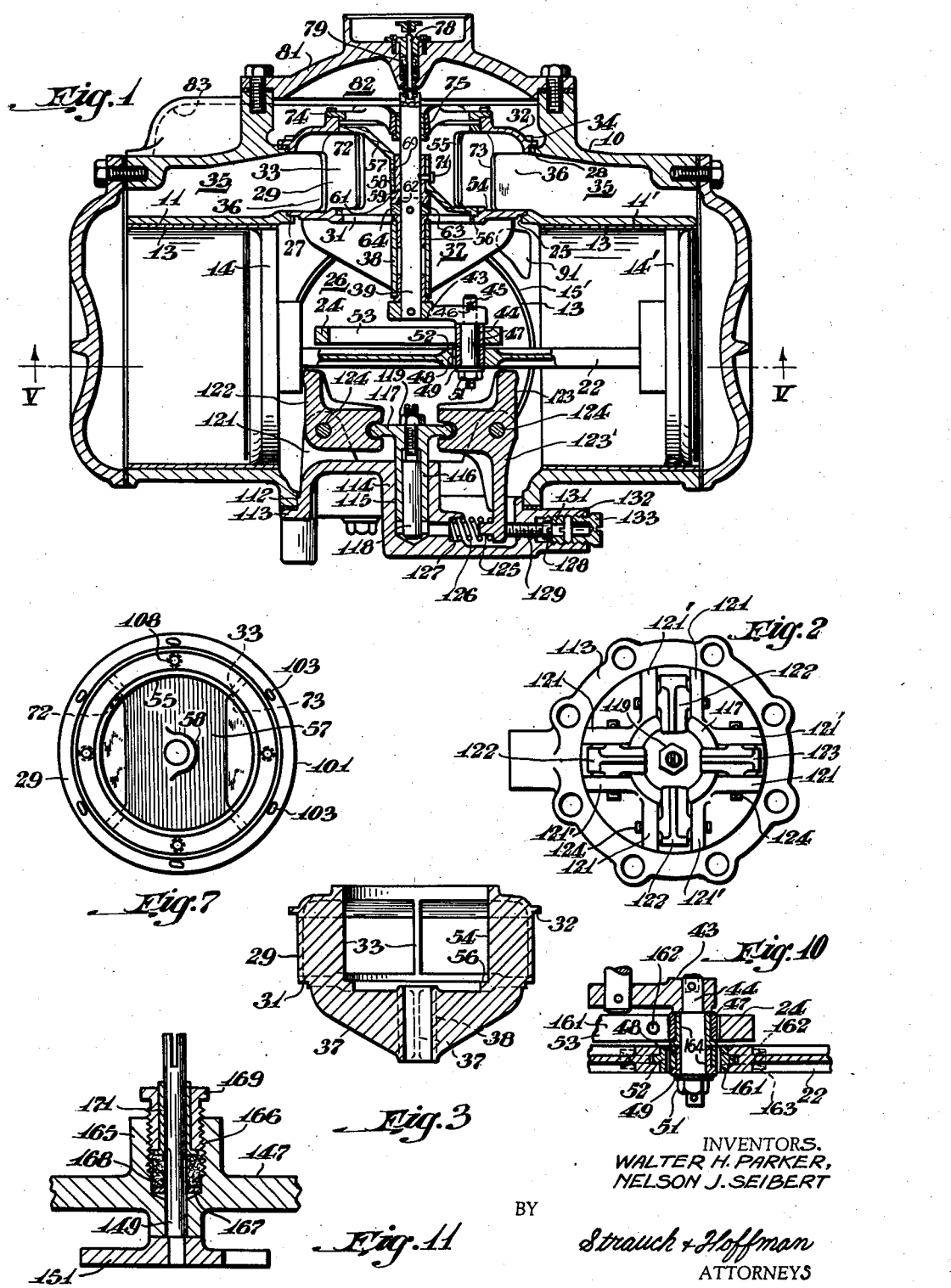

INVENTORS.
WALTER H. PARKER,
NELSON J. SEIBERT.
BY
Strauch & Hoffman
ATTORNEYS

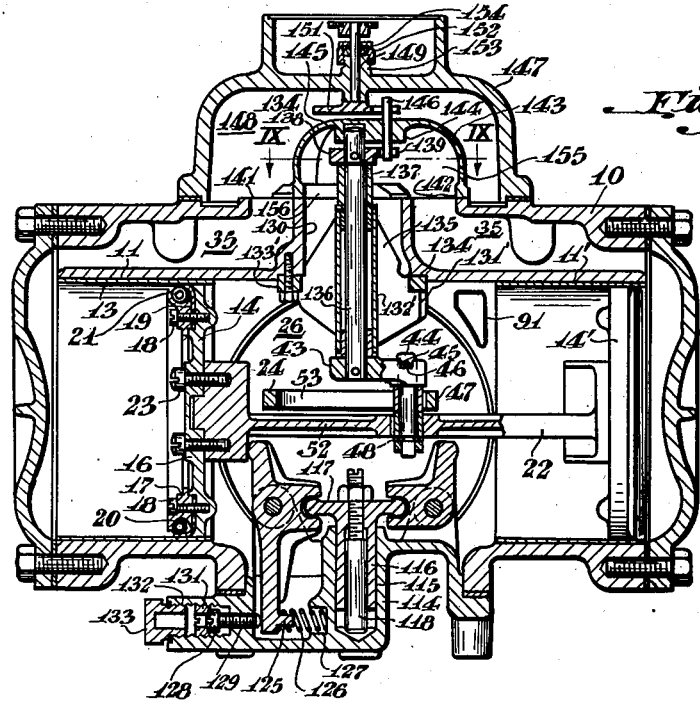
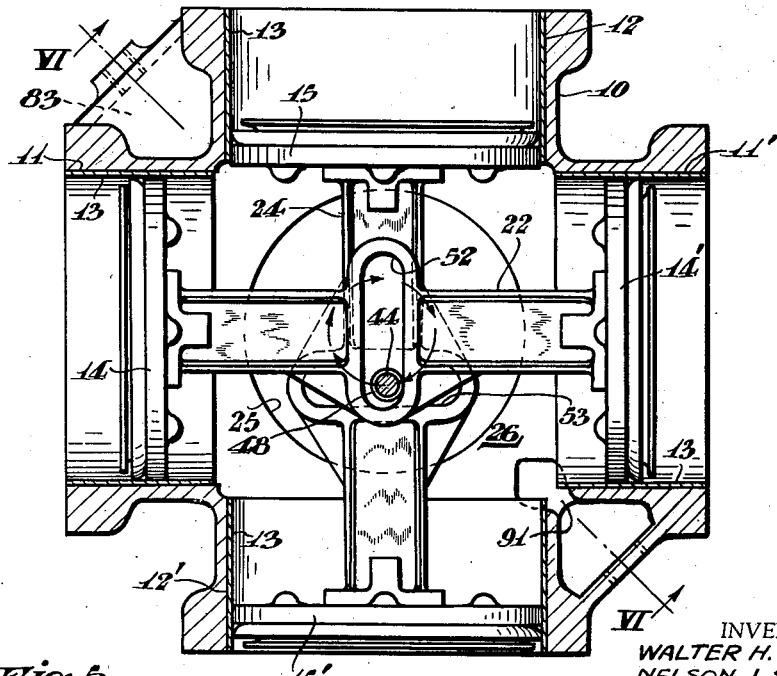

Patented Jan. 25, 1938

2,106,651

UNITED STATES PATENT OFFICE 2,106,651

PISTON METER

Walter H. Parker, Pittsburgh, and Nelson J. Seibert, Wilkinsburg, Pa., assignors to Pittsburgh Equitable Meter Company, Pittsburgh, Pa., a corporation of Pennsylvania Application April 9, 1934, Serial No. 719,788

12 Claims. (Cl. 73—247)

This invention relates to fluid meters of the positive displacement type, and more particularly relates to that type of meter known as piston meters.

In fluid meters of this type the measurement of fluid is accomplished by displacing a plurality of pistons located in suitable cylinders, and the movement of the pistons is transmitted through suitable mechanism to a register. A valve which is timed in relation to the movement of the pistons alternately admits and discharges fluid to and from these cylinders in proper sequence.

In meters of this type it has heretofore been proposed to calibrate the displaceable volume of the cylinders by limiting the movement of one of the pistons. This has been found somewhat disadvantageous as the timing of the valve which must be set so as to permit the proper sequential intake and discharge of fluid to the cylinders, and at the same time prevent hydraulic locking of the pistons at the extremes of their strokes becomes more or less a complicated operation. In constructions heretofore proposed the means provided in most cases for adjusting the stroke of the pistons has not been satisfactory due to their inability to compensate for wear. Further, piston meters of prior types generally involve a large number of parts, are expensive to manufacture, and do not provide for proper adjustment of the valve to compensate for wear or other factors affecting the accuracy and timing of the valve.

Accordingly, it is an object of the present invention to provide a piston meter having a novel means for adjusting the stroke of one or more sets of the pistons to permit accurate calibration of the displaceable volume of the cylinders in a manner to properly compensate for wear.

Still another object is the provision of a piston meter having a novel type of valve for distributing liquid to the cylinders, which is of simple construction and inexpensive to manufacture, and can be easily adjusted or timed in relation to the pistons.

Still another object is the provision of a novel unitary assembly comprising a readily adjustable valve and cage supporting the crank shaft which is removable as a unit for inspection or grinding and can readily be replaced with the assurance of being returned to its proper alignment.

Still a further object of this invention is the provision of a novel calibrating mechanism for a plurality of pistons in a piston meter, an equalized adjustment being readily secured, the entire adjustment assembly being readily removable as a unit from the meter for purposes of inspection and repair.

Other objects of the invention will be apparent from a consideration of the following specification taken in connection with the annexed drawings and in which:

Figure 1 is a vertical section of a preferred embodiment of the invention;

Figure 2 is a top plan view of the removable bottom cover and stroke adjusting means of the modification shown in Figure 1;

Figure 3 is a vertical section of the valve cage taken at an angle 45° to the section shown in Figure 1;

Figure 5 is a horizontal sectional view on a slightly reduced scale taken on line V—V of Figure 1 in the direction of the arrows, the cranks being rotated through 90° from their position as shown in Figure 1;

Figure 7 is a top plan view of the valve cage of the modification shown in Figure 4, the top spider being removed;

Figure 8 is a vertical section of a further preferred modification showing a modified valve structure;

Figure 10 is a fragmentary sectional view of a modified yoke slot and valve driving crank; and Figure 11 is a fragmentary sectional view of a modified stuffing box.

Figure 4:
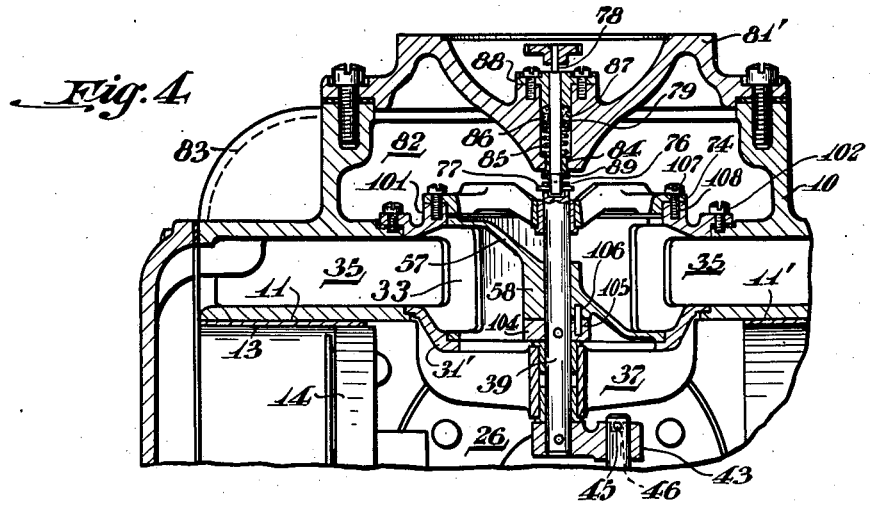
Figure 4 is a fragmentary vertical section of a second preferred modification of my invention shown in a manner similar to Figure 1.

Referring to the drawings, Figure 1, the meter comprises a casing 10 preferably formed as a casting which houses the working parts of the meter. The casing of all the modifications is similar and will be described in detail with reference to Figures 1, 5, and 6. The casing 10 has a pair of aligned cylinders 11, 11' and 12, 12' formed therein (Figures 1 and 5), and the cylinders have replaceable bronze or brass liners 13 tightly fitted therein and are closed at their outer ends by suitable cylinder heads bolted or otherwise secured to the casing. Two pairs of connected pistons 14, 14' and 15, 15' operate in the cylinders, and as they are alike in construction, only one will be described in detail.

The pistons of the assembly as shown, for example, by piston 14 (Figure 8) comprise a head 16 and an annular retainer 17 secured thereto by screws 18, a flexible cup or washer 19 of leather, rubber or other suitable material, being clamped therebetween. The retainer 17 has its periphery recessed as shown at 20 and within this recess is located a coil spring 21 formed into an annulus, the ends of the annulus being soldered to a plug (not shown) inserted into the spring at each end to reinforce the soldering joint. This spring serves to keep the flexible washer 19 resiliently engaged against the walls of the liner 13 to prevent leakage therebetween. The pairs of pistons 14 and 14' are secured together by a Scotch yoke 22 (Figures 1 and 5) having lugs at its ends to which the pistons are secured by screws 23. The similar Scotch yoke 24 joining the other pair of pistons 15, 15' crosses the yoke 22 at the center.

The casing 10 has a central vertical bore 25 through the top connecting with an interior chamber 26, and having a shoulder 27 at the bottom thereof and a shoulder 28 at the top. A cylindrical valve cage 29 is located in said bore and comprises a lower flange 31 seated on the step 27, an upper flange 32 seated on the upper step 28, suitable gaskets being inserted therebetween, and said flanges are connected by four vertical bars or spacers 33 which are 90° apart from center to center. The cage is secured in place by screws 34 passing through the top flange. The passages 35 through the body, which are parallel to the cylinders, are divided by walls which terminate in vertical ribs or spacers 36, and the cage 29 is so positioned that the outer edges of the vertical bars 33 abut these ribs in fluid tight engagement.

The lower flange 31 has four radial webs or spokes 37 integral therewith which support a central hub 38, and the crank shaft 39 is journalled therein in suitable bushings. The crank shaft 39 has a crank arm 43 pinned thereto at its inner end and a crank pin 44 is forced into a suitable bore in the outer end of crank arm 43, and is nonrotatably secured therein by a cross pin 45 passing through a slot 46 in the crank arm. A pair of bushings or rollers 47 and 48 are rotatably mounted on the crank pin 44 and are retained in place by a washer 49 seated on a shoulder of the pin 44 and a nut 51 threaded onto the reduced threaded end of the crank pin. The crank pin 44 passes through an elongated slot 52 formed in the yoke 22 the width of the slot being slightly greater than the diameter of bushing 48, and an elongated slot 53 is formed in the yoke 24 at right angles to the slot 52, this slot likewise being slightly wider than the bushing 47. This construction permits the yokes 22 and 24 to reciprocate successively with their pistons and at the same time to rotate the crank arm 43 and hence rotate the crank shaft 39.

The pistons are adapted to be reciprocated by the fluid to be measured, and a rotary valve is provided to successively admit and discharge liquid to the cylinders in the proper sequence. The valve cage has a cylindrical seat 54 therein, (Figures 1 and 3) and a cylindrical valve member 55 (Figures 1, 4, and 7) is rotatably mounted therein and rests upon a step 56 formed on the bottom flange 31 of the valve cage. The cylindrical valve is divided into two compartments by a diagonal dividing wall 57 integral therewith, and in the modification shown in Figure 1, it has a central hub 58, and a bushing 59 is located in the hub to rotate with the valve. The bushing 59 has a flange 61 which is cut away to form a tongue 62 and in assembly this tongue fits into a recess 63 formed in the collar 64 suitably pinned to crank shaft 39 whereby the valve is rotated upon rotation of the crank shaft. The collar 64 limits downward movement of the crank shaft. The bushing 59 is temporarily secured within the hub 58 by a set screw (not shown) threaded into hole 69 in the hub 58, and after the valve is correctly timed with the pistons the bushing is permanently secured to the valve by a plurality of pins 71 passing through holes drilled therethrough in assembled position.

Figure 6:
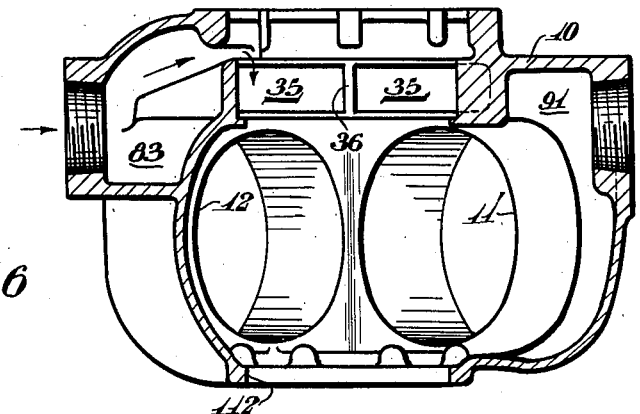
Figure 6 is a diagonal sectional view of the casing on a slightly reduced scale of the modification shown in Figure 4 corresponding to a section taken on line VI—VI of Figure 5 in the direction of the arrows.

The cylindrical valve 55 which is diametrically divided by the diagonal wall 57 has two ports 72 and 73 (Figure 7) which are slightly greater than 90° in extent and are separated by cylindrical lands which are slightly less than 90° in extent, the lands being bisected diagonally by the dividing wall. A spider 74 suitably secured to the top of the valve cage carries a bushed central hub 75 which provides an additional bearing for the crank shaft 39. The upper end of the crank shaft is slotted as at 76 (Figure 4) and is coupled by a pin 77 to a register drive shaft 78 which passes through a stuffing box 79 in cover 81 (Figure 1) or 81' (Figure 4) to drive a register (not shown) suitably supported thereon, and the cover provides a distributing chamber 82 normally filled with liquid which enters through a suitable inlet 83 (Figures 5 and 6). The stuffing box 79 (Figure 4) comprises bushing 84, a spring 85, a retainer washer 86, packing 87 and a gland or follower 88 bolted to the cover. A washer or stop 89 is spun onto the lower end of the register shaft 78 and limits upward movement thereof.

The modification shown in Figure 4 is similar in many respects to that of Figure 1. In this modification the upper flange 101 of the valve cage 29 is slightly modified and is secured directly to the meter casing by bolts 102 passing through elongated slots 103 (Figure 7) in the flange. The crank shaft 39 has a collar 104 pinned thereto, and a vertical pin 105 is secured in the collar and cooperates with a bore 106 in the hub 58 of the valve whereby the valve is driven. The collar 104 limits downward movement of the crank shaft 39. The upper flange 101 and the lower flange 31' of the valve cage are joined by similar vertical bars 33. The spider 74 is secured by screws 107 threaded into the holes 108.

Provision is made for adjusting the stroke of the pistons so that the meter can be calibrated accurately. The open lower end 112 of the casing 10 is closed by a suitable cover 113 bolted or otherwise secured thereto, and having a central hub 114 and a vertical bore 115 therein in which a guide 116 having an equalizer 117, at one end is slidably located. Equalizer 117 preferably is formed with a relatively thickened rim which is substantially circular in cross section, as shown in Figure 1. A pin 118 is threaded into the equalizer and is adjustably locked in place by a nut 119, the pin 118 serving to limit the downward movement of the guide and equalizer.

The cover 113 carries four pairs of lugs 121, 121' (Figures 1 and 2) between which are pivoted the three L-shaped adjustable stops 122, and a fourth stop 123 on pins 124 passing therethrough. The stop 123 has an extension 123' at its lower end. These stops are bifurcated at their inner ends to form rounded recesses which closely engage the thickened rim of equalizer 117. The extension 123' has a stub 125 at its lower end about which a spring 126 is located, the other end of the spring being received in a recess 127 located in the central hub 114 of the cover, the spring biasing the stop 123 radially inward. The side of extension 123' opposite to that mounting stub 125 is contacted by an adjusting screw 128 threadedly mounted in bore 129. An enlarged bore 132 is provided to accommodate the head of screw 128, a locking member 131 and a sealing plug 133 which may be sealed against unauthorized tampering in any desired manner.

In operation, liquid is supplied to the distributing chamber 82 from the inlet 83 and passing downward through the spider 74 is directed by the diagonal wall 57 and port 73 into the spaces between the cage bars 33 which communicate with a passage 35 leading to the end of cylinder 11' (Figure 5) and at the same time the exhaust port 72 is in communication with the diametrically opposite passage 35 leading to the end of cylinder 11, and conducts discharged liquid downward through the spokes 37 to the interior chamber 26, and thence through an outlet 91 from the meter. Thus, one cylinder 11' is receiving liquid while the opposite cylinder 11 is discharging liquid, while the pistons 15 and 15' are at the ends of their respective strokes and the lands of valve 55 seal the cylinders 12 and 12' from communication with inlet or outlet ports. As shown in Figure 5, the crank pin 44 is on dead center with respect to pistons 15 and 15' when valve 55 is in the position shown in Figure 7. Further movement of pistons 14' and 14 rotates pin 44 in the direction of the arrows off of dead center and rotates valve 55 to admit liquid to cylinder 12', while liquid from cylinder 12 is discharged as previously described. The circumference of the valve ports 73 and 72 is less than the space between adjacent bars 33 which in connection with the timing of the valve prevents hydraulic lock. The meter is calibrated by adjusting the stroke of the pistons. The stops 122 and 123 pivot about their respective pins 124 in unison, their pivotal movement being equalized by the equalizer 117 which is engaged by the bifurcated inner ends thereof. These stops are biased inwardly by spring 126 and outward movement is limited by the setting of screw 128, which limits the inward strokes of the pistons. By omitting certain of the stops 122, adjustment may be limited to as few as one set of pistons.

The valve 55 in the modification shown in Figure 1 is adjusted or timed in relation to the piston cycle by rotating it relative to the bushing 59. In the modification shown in Figures 4 and 7 the valve is adjusted with relation to the piston cycle by rotating the valve cage 29. For this purpose the cage is provided with slots 103 to permit the cage to be rotated relative to the valve 55 which is fixed on shaft 29 by means of driving pin 105 engaging recess 106. The valve is readily removable by removing the cover 81, and the spider 74, whereupon the valve can be lifted from its cage.

The modification shown in Figure 8 involves a further modified valve structure. The casing 10, which is similar to that shown in Figures 1, 5, and 6, has a central passage 130, and a spider 131' supports a central hub 132' mounted therein. The spider comprises a ring 133' seated in a suitable recess 134 surrounding the passage 130 and bolted to the casing, and the central hub 132' is supported by a plurality of radial spokes 135. The crank shaft 136 is suitably journalled in bushings in hub 132', and at its lower end is secured the crank arm 43. At its upper end a spacing sleeve 137 surrounds the crank shaft, and a dog 138 having a slot 139 at its outer end is pinned to the crank shaft. The casing 10 has a plane valve seat 141, and the central bore 130 passing therethrough provides an exhaust port to the central chamber of the meter. The intake ports 35 to the cylinders connect with the inlet ports 142 in the valve seat 141 surrounding the central outlet port 130.

The pistons are adapted to be reciprocated by the fluid to be measured, and a valve is provided to successively admit and discharge liquid to these cylinders in the proper sequence through the four inlet ports 142 and inlet passages 35 which connect with the cylinders adjacent the heads thereof. A hollow generally cup shaped valve member 143 is seated on the valve seat 141, this valve member being shown in Figure 8, 90° out of time with the pistons 14 and 14' for the purposes of illustration. In a thickened lug 144 in the top of the valve is formed a recess 145 to receive the upper end of the crank shaft 136, and the slot 139 of driving dog 138 engages a pin 146 pressed through the top of the valve member whereby the valve is rotated with the crank shaft.

Figure 9:
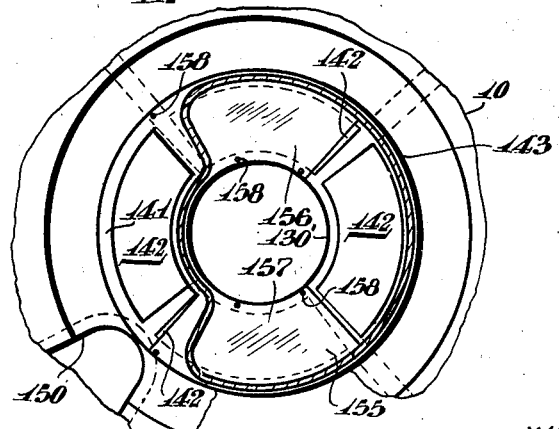
Figure 9 is a horizontal fragmentary section on the line IX—IX of Figure 8 showing the valve structure and valve seat.

The valve is covered by a cover 147 which provides a distributing chamber 148 normally filled with liquid which enters through a suitable inlet 150 (Figure 9). A register driving shaft 149 passes through the top of the cover 147, and at its lower end has secured thereto a slotted driven dog or crank 151 which engages the pin 146 whereby the shaft is rotated. A gland 152 threaded upon a suitable lug 153 in the cover provides a packing chamber 154 surrounding the register shaft to prevent leakage of liquid past the shaft.

The valve 143 as shown in Figure 8 is generally crescent shaped so that one inlet port 142 to each pair of cylinders is at all times in communication with the distributing chamber 148, and one port 142 of each of the opposite cylinders is at the same time connected with the interior chamber 155 of the valve 143 and is discharging through the central port 130. Short circuiting of incoming liquid is prevented by the lands 156 and 157 (Figure 9) which are about 90° apart and bear against the valve face 141 of the casing 10 and close off that part of a port 142 which is receiving incoming fluid, from communication with the interior chamber 155 of the valve. Suitable lubricating holes 158 are provided in the lands to supply fluid to the valve seat and lubricate the same. The liquid which passes into the central chamber 26 is discharged therefrom through the outlet port 91 as in the modification previously described.

In the modification shown in Figure 10, the slots 52 and 53 are lined with nitrided steel or similar wear resistant liners. The liners 161 are located on both sides of the slots and are secured in position by suitable rivets 162 at each end which pass through the lugs 163 provided therefor on the yokes, the inner ends of the rivets being flush with the inner surface of the liner. The rollers 47 and 48 are pressed onto bushings 164 of self lubricating bronze and are journalled on crank pin 44.

The modified stuffing box shown in Figure 11 comprises a hollow internally threaded lug 165 on the upper surface of cover 147. The register driving shaft 149 passes through a packing recess 166 which contains a washer 167, packing material 168 and a follower 169 threaded into the lug 165, and a gland 171. The packing is compressed by screwing follower 169 into lug 165.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a fluid meter, a valve cage having a cylindrical valve seat therein and connecting bars joining the upper and lower flanges thereof, a hub centrally supported by spokes integral with said lower flange, a spider removably secured to the upper flange of said cage, a crank shaft rotatably journalled in said hub and spider, a collar pinned to said shaft to limit downward movement thereof, a valve seated in said cage, a longitudinal pin in said collar and fitting into a recess in said valve for driving the same.

2. In a positive displacement meter, a valve cage comprising an upper and a lower flange and bars joining said flanges, a hub centrally supported by spokes integral with the lower flange, a spider removably secured to the top of said cage, a valve drive shaft journalled in said hub and spider and having a collar secured thereon, a cylindrical valve seated in said cage, said valve having a central hub, and a bushing located in said hub of the valve and fixed thereto and having a tongue and groove connection with said collar for rotating said valve.

3. In a fluid meter, a casing having a plurality of cylinders therein formed radially about a common center, and having an opening formed in one side thereof, pistons in said cylinders, a cover carrying adjusting mechanism closing said opening, said adjusting mechanism comprising a plurality of individually pivoted stops adapted to be engaged by said pistons at the inner limit of their stroke, means to interconnect said stops so that movement of one stop due to engagement by a piston will effect movement of all stops and means extending through said cover for radially adjusting said stops to thereby vary the stroke of said pistons.

4. In a fluid meter, a casing having a plurality of cylinders therein formed radially about a common center, and having an opening in one side thereof, pistons in said cylinders, a cover carrying stroke adjusting mechanism for closing said opening, said cover having a central bore, a guide vertically reciprocable in said bore and having an equalizer at one end thereof, a plurality of stops pivotally mounted and engaging said equalizer, and means extending through said cover for radially adjusting said stops to vary the stroke of said pistons.

5. In a fluid meter, a casing having a plurality of cylinders therein formed about a common center, a plurality of pistons in said cylinders, said pistons being interconnected in pairs, means for adjusting the stroke of said pistons, a valve cage secured in said casing and including an integral hub, a spider removably secured to said cage, a crank shaft journalled in said hub and spider, a cover providing a distributing chamber over said cage, a register drive shaft extending through said cover and forming with said crank shaft an interlocked connection, and a rotatable valve located in said cage, and means for adjusting relatively the timing of said valve and cage.

6. In a fluid meter, a casing having a plurality of cylinders therein formed radially about a common center, and having an opening in one side thereof, pistons arranged to operate in said cylinders, a cover for closing said opening, an equalizer guided for vertical movement in the cover, a plurality of stops pivotally mounted and engaging said equalizer, and means extending through said cover for radially adjusting said stops to vary the stroke of said pistons.

7. In a fluid meter, a casing having a plurality of cylinders formed radially about a common center, and having an opening in one side thereof, pistons arranged to operate in said cylinders, a cover for closing said opening, an equalizer comprising a disk with a thickened rim substantially circular in cross section guided for vertical movement in the cover, a plurality of stops pivotally mounted and having rounded recesses engaging the rounded rim of said equalizer, and means extending through said cover for radially adjusting said stops to vary the stroke of said pistons.

8. In a fluid meter, a casing having a plurality of cylinders therein radially disposed about a common center, pistons arranged to operate in said cylinders, a plurality of adjustable stops pivotally mounted independently to engage said pistons to control the strokes thereof, means to adjust one of said stops and equalizing means to communicate movement of one stop to said remaining stops.

9. In a fluid meter, a casing having a plurality of cylinders therein radially disposed about a common center, pistons arranged to operate in said cylinders, a plurality of adjustable stops pivotally mounted to engage said pistons to control the strokes thereof, means to adjust one of said stops and equalizing means associated with said stops and arranged for movement substantially normal to the axes of said cylinders to communicate said adjustment to said remaining stops.

10. In a fluid meter, a casing having a common fluid distributing chamber and a plurality of cylinders on one side of said chamber and provided with inlet passages opening into said common fluid distributing chamber and providing shoulders on both sides of said passages in said distributing chamber, a removable cover for said chamber on the side of said chamber opposite said cylinders, pistons in said cylinders, a valve cage having flanges engaging said shoulders in sealing relation thereto, the openings of said cage registering with said passages, a valve seat in said cage, a valve seated therein and adapted to be rotated by said pistons and means accessible upon removal of said cover releasingly securing said valve cage in position and allowing rotation of the cage for adjustment thereof.

11. In a fluid meter, a casing having a fluid distributing chamber and a plurality of cylinders on one side of said chamber, pistons in said cylinders, fluid passages connecting said cylinders with said chamber, a valve cage in said distributing chamber, a valve seated therein arranged to be rotated by said pistons, said casing having a removable cover for said chamber on the side thereof opposite said cylinders, and means accessible upon removal of said cover to adjust said valve cage.

12. In a fluid meter, a casing having an opening in one side thereof, a cover for said opening, a plurality of cylinders in said casing, a fluid distributing chamber defined by said cover and a portion of said casing, said cylinders and said chamber being connected by a plurality of fluid passages, pistons in said cylinders, a valve cage positioned in said casing in fluid tight engagement therewith and between said cover and said cylinders, an operating shaft arranged to be driven by said pistons, a valve seat in said cage, a valve in said seat secured to said shaft to be rotated thereby, and means in said fluid distributing chamber between said valve cage and said cover for adjustably securing said cage to said casing.

WALTER H. PARKER.
NELSON J. SEIBERT.